(12) United States Patent
Wu et al.

(10) Patent No.: US 7,733,920 B1
(45) Date of Patent: Jun. 8, 2010

(54) PROGRAMMABLE PRE-EMPHASIS CIRCUIT FOR SERIAL ATA

(75) Inventors: Lei Wu, Sunnyvale, CA (US); Timothy Hu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 237 days.

(21) Appl. No.: 11/904,886

(22) Filed: Sep. 28, 2007

Related U.S. Application Data

(63) Continuation of application No. 10/277,449, filed on Oct. 22, 2002, now Pat. No. 7,319,705.

(51) Int. Cl.
*H04J 3/04* (2006.01)
(52) U.S. Cl. ........................ 370/534; 710/300
(58) Field of Classification Search .................. None
See application file for complete search history.

(56) References Cited

U.S. PATENT DOCUMENTS

| | | |
|---|---|---|
| 4,456,965 A | 6/1984 | Graber et al. |
| 4,747,047 A | 5/1988 | Coogan et al. |
| 5,210,855 A | 5/1993 | Bartol |
| 5,220,275 A | 6/1993 | Holmqvist |
| 5,222,062 A | 6/1993 | Sharma et al. |
| 5,274,665 A | 12/1993 | Schilling |
| 5,331,646 A | 7/1994 | Krueger et al. |
| 5,446,767 A | 8/1995 | Nakagawa et al. |
| 5,471,152 A | 11/1995 | Gheewala et al. |
| 5,471,585 A | 11/1995 | Barakat et al. |
| 5,553,230 A | 9/1996 | Petersen et al. |
| 5,564,114 A | 10/1996 | Popat et al. |
| 5,661,765 A | 8/1997 | Ishizu |
| 5,748,645 A | 5/1998 | Hunter et al. |
| 5,783,960 A | 7/1998 | Lackey |
| 5,787,485 A | 7/1998 | Fitzgerald et al. |
| 5,802,318 A | 9/1998 | Murray et al. |
| 5,812,754 A | 9/1998 | Lui et al. |
| 5,826,048 A | 10/1998 | Dempsey et al. |
| 5,828,854 A | 10/1998 | Wade |
| 5,848,278 A | 12/1998 | Sakai |
| 5,854,941 A | 12/1998 | Ballard et al. |
| 5,886,901 A | 3/1999 | Magoshi |

(Continued)

FOREIGN PATENT DOCUMENTS

EP 0876016 11/1998

(Continued)

OTHER PUBLICATIONS

Serial ATA II; Extensions to Serial ATA, 1.0, Revision 1.0, Oct. 16, 2002, APT Technologies, Inc., Dell Computer Corporation, Intel Corporation, Maxtor Corporation, Seagate Technology.

(Continued)

*Primary Examiner*—Bob A Phunkulh

(57) ABSTRACT

A high-speed serial ATA physical layer includes a serial ATA control circuit. A serial ATA multiplexer outputs one of a plurality of serial ATA signals that is selected by the serial ATA control circuit. A serial ATA analog front end provides a first gain and pre-emphasis to the selected one of the plurality of serial ATA signals. The pre-emphasis alters a transmission characteristic of the selected one of the plurality of serial ATA signals.

18 Claims, 8 Drawing Sheets

U.S. PATENT DOCUMENTS

| | | | |
|---|---|---|---|
| 5,894,560 A | 4/1999 | Carmichael et al. | |
| 5,909,451 A | 6/1999 | Lach et al. | |
| 6,009,275 A | 12/1999 | DeKoning et al. | |
| 6,021,462 A | 2/2000 | Minow et al. | |
| 6,057,863 A | 5/2000 | Olarig | |
| 6,059,836 A | 5/2000 | Liguori | |
| 6,073,188 A | 6/2000 | Fleming | |
| 6,092,169 A | 7/2000 | Murthy et al. | |
| 6,106,568 A | 8/2000 | Beausang et al. | |
| 6,124,727 A | 9/2000 | Bridgewater et al. | 326/33 |
| 6,178,215 B1 | 1/2001 | Zhang et al. | |
| 6,223,238 B1 | 4/2001 | Meyer et al. | |
| 6,237,052 B1 | 5/2001 | Stolowitz | |
| 6,314,145 B1 | 11/2001 | van Driest | |
| 6,330,687 B1 | 12/2001 | Griffith et al. | |
| 6,363,439 B1 | 3/2002 | Battles et al. | |
| 6,367,033 B1 | 4/2002 | Jibbe | |
| 6,378,039 B1 | 4/2002 | Obara et al. | |
| 6,388,590 B1 | 5/2002 | Ng | 341/100 |
| 6,388,591 B1 | 5/2002 | Ng | 341/100 |
| 6,442,722 B1 | 8/2002 | Nadeau-Dosic | |
| 6,447,340 B1 | 9/2002 | Wu | |
| 6,484,294 B1 | 11/2002 | Kiyoshige et al. | |
| 6,496,900 B1 | 12/2002 | McDonald et al. | |
| 6,549,981 B2 | 4/2003 | McDonald et al. | |
| 6,557,065 B1 | 4/2003 | Peleg et al. | |
| 6,564,271 B2 | 5/2003 | Micalizzi, Jr. et al. | |
| 6,578,126 B1 | 6/2003 | MacLellan et al. | |
| 6,614,842 B1 | 9/2003 | Chou et al. | |
| 6,662,076 B1 | 12/2003 | Conboy et al. | |
| 6,678,768 B1 | 1/2004 | Craft | |
| 6,687,775 B1 | 2/2004 | Basset | |
| 6,697,867 B1 | 2/2004 | Chong, Jr. | |
| 6,704,300 B1 | 3/2004 | Chen et al. | |
| 6,731,688 B1 | 5/2004 | Johnson | 375/257 |
| 6,791,779 B1 | 9/2004 | Singh et al. | |
| 6,792,494 B2 | 9/2004 | Bennett et al. | |
| 6,813,688 B2 | 11/2004 | Wu et al. | |
| 6,845,420 B2 | 1/2005 | Resnick | |
| 6,854,045 B2 | 2/2005 | Ooi et al. | |
| 6,898,655 B1 | 5/2005 | Sutardja | |
| 6,908,330 B2 | 6/2005 | Garrett et al. | |
| 6,915,380 B2 | 7/2005 | Tanaka et al. | |
| 6,917,992 B2 | 7/2005 | Grimsrud et al. | |
| 6,922,738 B2 | 7/2005 | Drescher et al. | |
| 6,928,509 B2 | 8/2005 | Surugucchi | |
| 6,961,813 B2 | 11/2005 | Grieff et al. | |
| 6,978,337 B1 | 12/2005 | Chang | |
| 7,089,345 B1 | 8/2006 | Lynn | |
| 7,103,496 B2 | 9/2006 | Hong | 702/124 |
| 2002/0159311 A1 | 10/2002 | Coffey et al. | |
| 2002/0173925 A1 | 11/2002 | Sugawara et al. | 702/107 |
| 2002/0186706 A1 | 12/2002 | Chren et al. | |
| 2003/0005231 A1 | 1/2003 | Ooi et al. | |
| 2003/0035504 A1 | 2/2003 | Wong et al. | |
| 2003/0074515 A1 | 4/2003 | Resnick | |
| 2003/0081743 A1 | 5/2003 | Chiang et al. | 379/93 |
| 2003/0135577 A1 | 7/2003 | Weber et al. | |
| 2003/0145264 A1 | 7/2003 | Siegel et al. | |
| 2003/0167367 A1 | 9/2003 | Kaushik et al. | |
| 2003/0236952 A1 | 12/2003 | Grieff et al. | |
| 2004/0015637 A1 | 1/2004 | Yau | |
| 2004/0024950 A1 | 2/2004 | Surugucchi | |
| 2004/0044802 A1 | 3/2004 | Chiang et al. | |
| 2004/0068591 A1 | 4/2004 | Workman et al. | |
| 2004/0081179 A1 | 4/2004 | Gregorcyk, Jr. | |
| 2004/0083323 A1 | 4/2004 | Rabinovitz et al. | |
| 2004/0083324 A1 | 4/2004 | Rabinovitz et al. | |
| 2004/0088441 A1 | 5/2004 | Chiang et al. | |
| 2004/0100944 A1 | 5/2004 | Richmond et al. | |
| 2004/0113662 A1 | 6/2004 | Grimsrud | |
| 2004/0117522 A1 | 6/2004 | Loffink et al. | |
| 2004/0120353 A1 | 6/2004 | Kim et al. | |
| 2004/0199515 A1 | 10/2004 | Penny et al. | |
| 2004/0203295 A1 | 10/2004 | Hadba et al. | |
| 2004/0205288 A1 | 10/2004 | Ghaffari et al. | |
| 2004/1098104 | 10/2004 | Hadba et al. | |
| 2004/0252672 A1 | 12/2004 | Nemazie | 370/351 |
| 2004/0252716 A1 | 12/2004 | Nemazie | |
| 2004/0264284 A1 | 12/2004 | Priborsky et al. | |
| 2005/0005216 A1 | 1/2005 | Chameshlu et al. | |
| 2005/0015655 A1 | 1/2005 | Clayton et al. | |
| 2005/0024083 A1 | 2/2005 | Kitzmura et al. | |
| 2005/0027894 A1 | 2/2005 | Ayyavu et al. | |
| 2005/0055501 A1 | 3/2005 | Guha et al. | |
| 2005/0144490 A1 | 6/2005 | Igari | |
| 2005/0186832 A1 | 8/2005 | Nemazie | 439/378 |
| 2005/0204078 A1 | 9/2005 | Steinmetz et al. | |
| 2005/0246475 A1 | 11/2005 | Ervin | |
| 2005/0251588 A1 | 11/2005 | Hoch et al. | |

FOREIGN PATENT DOCUMENTS

| | | | |
|---|---|---|---|
| GB | 2 408 624 A | 3/2004 | |

OTHER PUBLICATIONS

Authoritative Dictionary; pp. 123-124.
RAID Anatomy 101; Alan Benway; Oct. 2000; 7 pages.
Taking a Ride on the Bus; Alan Benway; Apr. 2000; 5 pages.
Serial ATA Next Generation Storage Interface; Mark Kymin; Jun. 9, 2005; pp. 1-6.
SATA PHY Interface Specification (SAPIS) Draft—Rev 0.90; Intel Corporation; Feb. 8, 2002; pp. 1-12.
SATA Technology; www.sata-or.org; Dec. 15, 2004; 8 pages.
SATA v PATA; Sanjeeb Nanda, Computer Technology Review; Nov. 2002; p. 18.
SATA (FAQs); Seagate Technology LLC; 2005; 3 pages.
Serial ATA: High Speed Serialized AT Attachment; Revision 1.0a; Jan. 7, 2003; APT Technologies, Inc., Dell Computer Corporation, Intel Corporation, Maxtor Corporation, Seagate Technology; 311 pages.
Serial ATA-to-Ultra ATA Adapter; SIIG, Inc.; 2 pages.
Tempo Bridge G5 Serial ATA Interface to Parallel ATA Drive Adapter; Sonnet Technologies, Inc., Revised 2005; 3 pages.
Serial ATA in Servers and Networked Storage; 2002; 12 pages.
Serial ATA II: Port Multiplier, Revision 1.0, Mar. 25, 2003, APT Technologies, Inc., Dell Computer Corporation, Intel Corporation, Maxtor Corporation, Seagate Technology; 34 pages.
Serial ATA II Workgroup; Serial ATA II Specification Port Selector, Proposed Draft; Revision 1.0RC, Jun. 23, 2003; 21 pages.
Information Technology—AT Attachment with Packet Interface—6 (ATA/ATAPI-6), Working Draft, T13 1410D, Revision 3; Peter T. McLean; Oct. 30, 2001; 496 pages.
Serial ATA II: Port Selector, Revision 1.0, Jul. 28, 2003; Dell Computer Corporation, Intel Corporation, Maxtor Corporation, Seagate Technology, Vitesse Semiconductor Corporation; 20 pages.
"Serial ATA: High Speed Serialized AT Attachment", Serial ATA Organization, Revision 1.0, Aug. 29, 2001.
Supplements to "Serial ATA: High Speed Serialized AT Attachment", Serial ATA Organization, Revision 1.0, Aug. 29, 2001.
Errata to "Serial ATA: High Speed Serialized AT Attachment", Serial ATA Organization, Revision 1.0, Aug. 29, 2001.

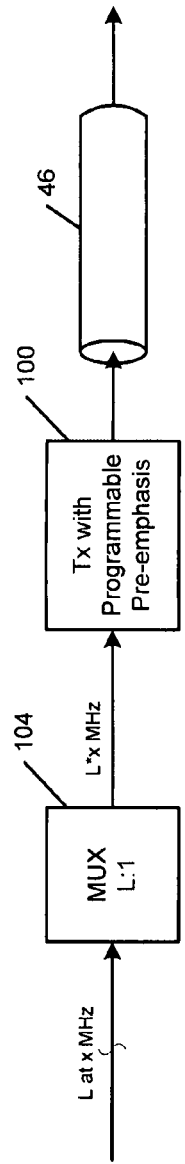
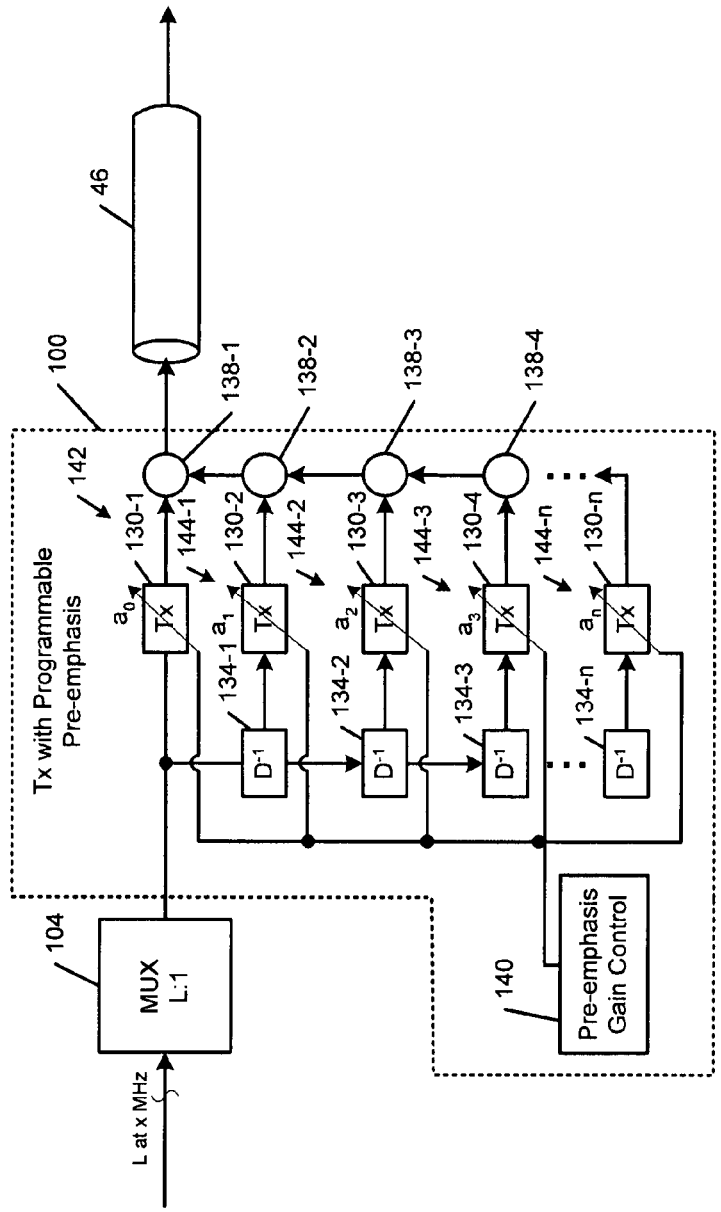

PROGRAMMABLE PRE-EMPHASIS CIRCUIT FOR SERIAL ATA

CROSS-REFERENCE TO RELATED APPLICATIONS

This application is a continuation of U.S. patent application Ser. No. 10/277,449 filed on Oct. 22, 2002. The disclosure of the above application is incorporated herein by reference.

FIELD OF THE INVENTION

The present invention relates to serial ATA communications channels, and more particularly to a programmable pre-emphasis circuit for a serial ATA communications channel.

BACKGROUND OF THE INVENTION

A host and a device typically transmit and receive data to and from each other. For example in a personal computer environment, a disk drive controller (host) is often connected to a disk drive (device). Referring now to FIG. 1A, a host 10 includes a receiver 12 and a transmitter 14. A device 16 includes a receiver 18 and a transmitter 20. The transmitter 14 of the host 10 transmits host data 22 to the receiver 18 of the device 16. The transmitter 20 of the device 16 transmits device data 24 to the receiver 12 of the host 10. In the personal computer environment the host 10 can be a disk controller 10-1 and the device 16 can be a disk drive 16-1 as shown in FIG. 1B. Still other hosts and devices can be employed.

The host and the device are connected using a Serial Advanced Technology Attachment (SATA) standard, which is generally identified at 26. The SATA standard is a simplified packet switching network between a host and a device. SATA typically employs balanced voltage (differential) amplifiers and two pairs of wires that connect transmitters and receivers of the host 10 and the device 16 in a manner similar to 100BASE-TX Ethernet. The SATA standard is disclosed in "Serial ATA: High Speed Serialized AT Attachment", Serial ATA Organization, Revision 1.0, 29, Aug. 2001, and its Supplements and Errata, which are hereby incorporated by reference.

Referring now to FIG. 1C, a typical physical layer (PHY) 28 of the host 10 and/or the device 16 is shown generally at 29. An analog front end 30 provides an interface to the data transmission lines. The analog front end 30 includes differential drivers and receivers and/or out-of-band signaling circuits. A PHY control circuit 31 controls the functionality of the PHY 28. Fixed pattern source and detect circuits 32 and 33, respectively, are optional circuits that provide ALIGN primitives. The fixed pattern detect circuit 33 generates a COMMA signal when a K28.5 character is detected in the received data.

DataIn[0:n] and an output of the fixed pattern source 32 are input to a multiplexer 34. The PHY control circuit 31 controls the multiplexer 34. DataIn[0:n] includes data sent from the link layer to the PHY 28 for serialization and transmission. A data extraction circuit 35 separates the clock (RecClk clock signal) and data received by the receivers in the analog front end 30. The TxClk output from the control circuit 31 regulates the frequency of the serial stream. DataOut[0:n], which is passed to the link layer, includes data that is received and deserialized by the PHY 28. The SYSCLK signal is a reference clock signal that is used to establish the transmitter interface speed. Other control inputs and outputs generally identified by MISC in FIG. 1C are specified in the SATA standard.

Referring now to FIG. 2, the transmitter 14 of the host 10 or the transmitter 20 of the device 16 is shown. Differential data ($D(0)^+$ and $D(0)^-$) to be transmitted is received by differential inputs of a differential driving device 40. The differential driving device 40 creates a differential voltage ($V^+$ and $V^-$) by driving differential outputs ($i_0^+$ and $i_0^-$) through loads 42 and 44. A communications channel 46 transmits the differential voltage to the receiver 18 of the device 16 or to the receiver 12 of the host 10. The transmission characteristics of the communications channel 46 may attenuate or otherwise alter the signal that is received by the receiver at the opposite end of the communications channel 46, which may increase bit error rates.

Referring now to FIG. 3, the differential output voltage in an ideal communications channel 46 is shown. In FIG. 4, the differential output voltage of a band-limiting communications channel is shown, which is a typical characteristic of the communications channel 46. The transition from 0 to 1 to 0 creates an "eye"-shaped waveform that is generally identified at 48 in FIGS. 4 and 5. As the band-limiting transmission characteristic increases, the "eye" closes as shown by arrows 49, which makes the 0-1-0 transition more difficult to detect.

SUMMARY OF THE INVENTION

A high-speed serial ATA physical layer according to the present invention transmits data over a communications medium using a serial ATA protocol. A serial ATA control circuit controls operation of the serial ATA physical layer. A serial ATA multiplexer outputs a serial ATA signal and has a plurality of input lines for receiving input data and a control input that communicates with the serial ATA control circuit. A serial ATA analog front end includes a first differential driver that communicates with the serial ATA multiplexer and provides a first gain to the serial ATA signal and a serial ATA pre-emphasis circuit that provides pre-emphasis to the serial ATA signal to alter a transmission characteristic of the serial ATA signal.

In other features, the serial ATA physical layer is implemented in a serial ATA device or a serial ATA host. The first differential driver generates a first amplified signal. The pre-emphasis circuit includes a first delay element that delays the first amplified signal to generate a first delayed signal, a second driver that amplifies the first delayed signal using a second gain to generate a second amplified signal, and a first summing circuit that adds the first amplified signal and the second amplified signal to generate a sum.

In yet other features, the pre-emphasis circuit further includes a second delay element that delays the second amplified signal to generate a second delayed signal. A third driver amplifies the second delayed signal using a third gain to generate a third amplified signal. The summing circuit adds the third amplified signal to the sum.

In still other features, the pre-emphasis circuit further includes a third delay element that delays the third amplified signal to generate a third delayed signal. A fourth driver amplifies the third delayed signal using a fourth gain to generate a fourth amplified signal. The summing circuit adds the fourth amplified signal to the sum.

In other features, the first, second and third delay elements provide at least one of unit delays and partial unit delays. The multiplexer receives L input lines at x frequency and outputs the first serial ATA signal at L*x frequency. L*x is greater than 1.4 GHz.

In other features, the first differential driver includes a gain control circuit that controls the first gain. n differential amplifiers have differential inputs that communicate with first and second inputs, differential outputs that communicate with first and second outputs, and enable inputs that communicate with the gain control circuit. The gain control circuit selectively enables the n differential amplifiers to adjust the first gain.

The second differential driver includes a pre-emphasis gain control circuit that controls the second gain. m differential amplifiers have differential inputs that communicate with first and second inputs, differential outputs that communicate with first and second outputs, and enable inputs that communicate with the pre-emphasis gain control circuit. The pre-emphasis gain control circuit selectively enables the m differential amplifiers to adjust the second gain.

In still other features, the communications channel has a band-limiting transmission characteristic. The pre-emphasis circuit compensates for the band-limiting transmission characteristic. The pre-emphasis circuit adjusts delays of the first and second delay elements and the first and second gains based on a selected communication channel medium.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a functional block diagram of a transmitter with programmable pre-emphasis according to the present invention for a serial ATA channel;

FIG. 8 is a functional block diagram of the transmitter of FIG. 6 in further detail;

DETAILED DESCRIPTION OF THE PREFERRED EMBODIMENTS

Figure 1A:
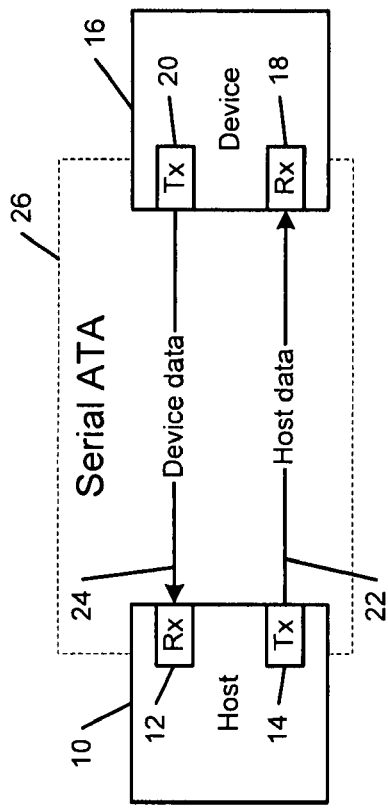
FIG. 1A is a functional block diagram of a host and a device with a connection based on the SATA standard according to the prior art.
Figure 1B:
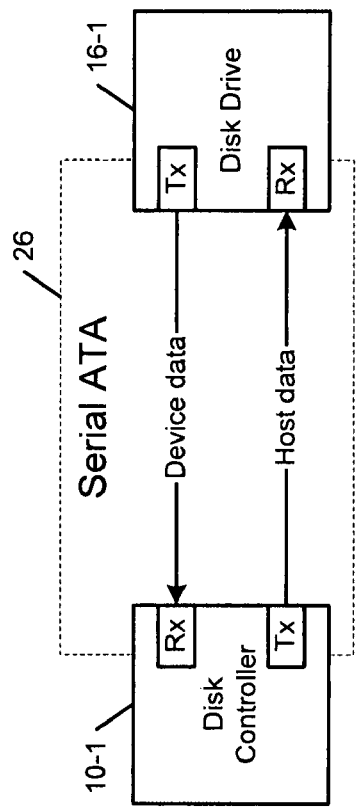
FIG. 1B is a functional block diagram of a disk controller (host) and a disk drive (device) with a connection based on the SATA standard according to the prior art.
Figure 1C:
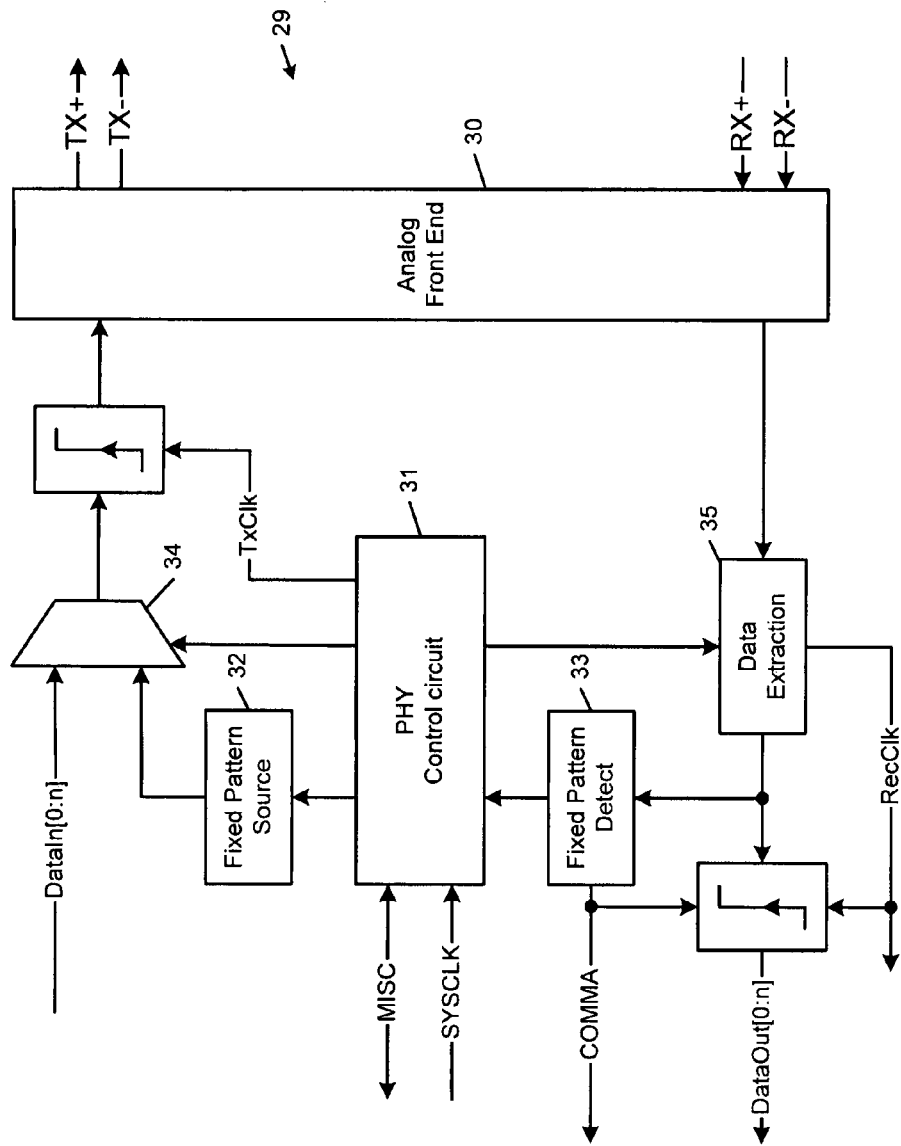
FIG. 1C is a functional block diagram of a serial ATA physical layer according to the prior art.
Figure 2:
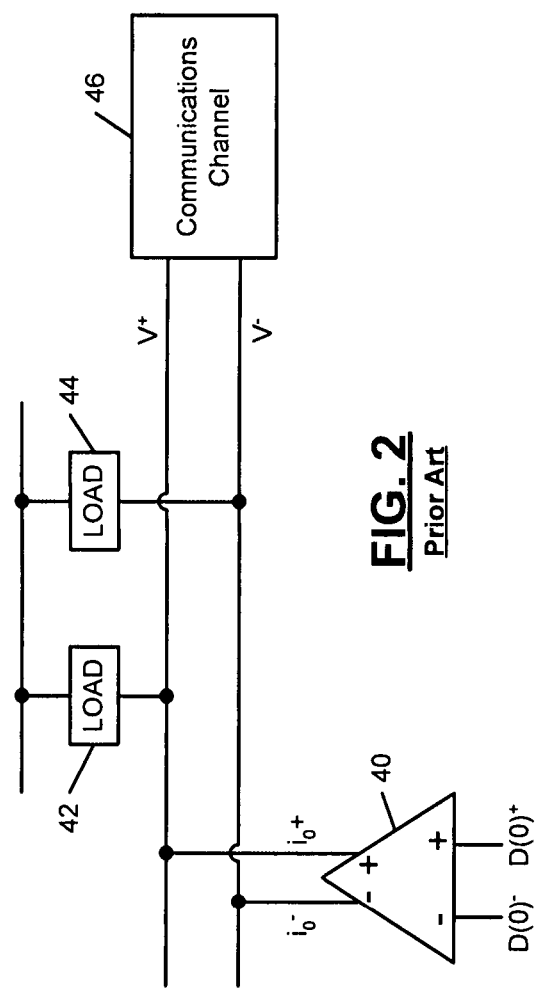
FIG. 2 is a functional block diagram of a differential driving device for the transmitter of the host and/or the device according to the prior art.
Figure 3:
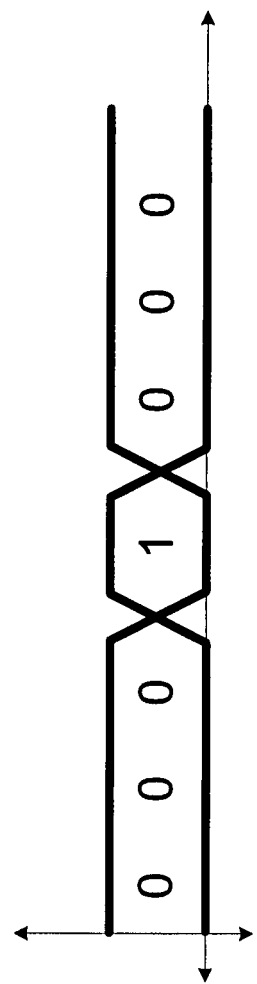
FIG. 3 illustrates a differential voltage waveform at the receiver end of an ideal communications channel.
Figure 4:
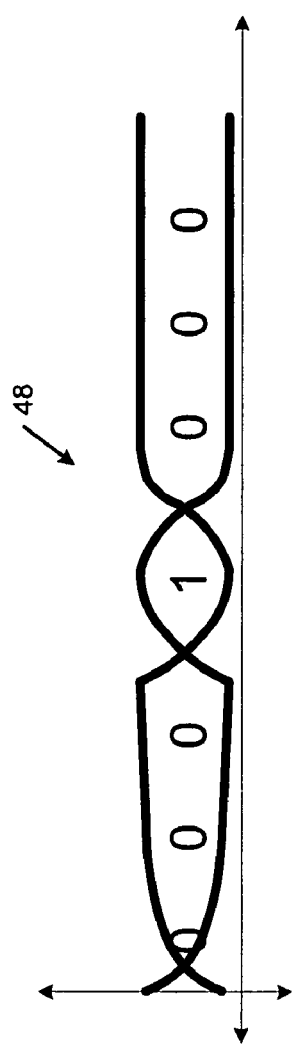
FIG. 4 illustrates a differential voltage waveform at the receiver end of a band-limited communications channel.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 6, a transmitter 100 with programmable pre-emphasis according to the present invention for a serial ATA channel is shown. Data is received by a multiplexer 104 on L lines each at x MHz. For example, current serial ATA standards specify L=10 and x=150 MHz, although other numbers of input lines and higher or lower data rates are contemplated. The multiplexer 104 outputs data at L*x MHz. The transmitter 100 provides programmable pre-emphasis based on transmission characteristics of the communications channel 46 to reduce receiver error rates. For example, the transmitter 100 may provide pre-emphasis to offset band-limiting characteristics of the communications channel 46. Because the pre-emphasis is programmable, the transmitter 100 can be readily adapted to the particular transmission characteristics of other communications channels 46.

Figure 7:
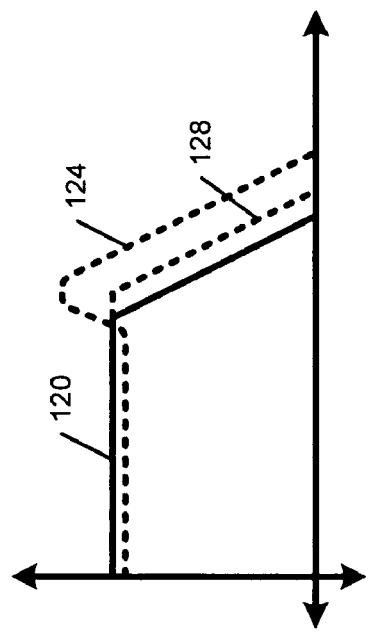
FIG. 7 illustrates a transmission characteristic of a band-limited channel before pre-emphasis, an exemplary pre-emphasis transmission characteristic, and a transmission characteristic after pre-emphasis.
Figure 5:
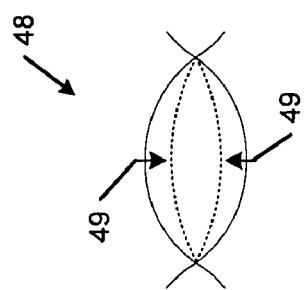
FIG. 5 illustrates a closing "eye"-shaped waveform as the band limiting characteristics of a communications channel increase.

Referring now to FIG. 7, a transmission characteristic of a band-limited channel before pre-emphasis is shown generally at 120. A pre-emphasis transmission characteristic is shown at 124. The resulting or combined signal is shown at 128. As a result of the pre-emphasis in this example, the eye-shaped waveform 48 in FIG. 5 is opened, which improves data error rates of the receiver at the opposite end of the communications channel 46. As can be appreciated, the transmission characteristic and the pre-emphasis will vary for other types of communications channels 46.

Referring now to FIG. 8, the transmitter 100 includes driving devices 130-1, 130-2, 130-3, 130-4, . . . , and 130-$n$, delay elements 134-1, 134-2, 134-3, . . . , and 134-$n$, summing circuits 138-1, 138-2, 138-3, . . . , and 138-$n$, and a pre-emphasis gain control circuit 140. The data output by the multiplexer 104 is input to the driving device 130-1, which provides a first gain $a_0$, and to a delay chain including the delay elements 134-1, 134-2, . . . , and 134-$n$.

An output of the delay element 134-1 is input to the driving device 130-2, which provides a second gain $a_1$. The output of the delay element 134-1 is also output to the delay element 134-2. An output of the delay element 134-2 is input to the driving device 130-3, which provides a third gain $a_2$. The output of the delay element 134-2 is also input to the delay element 134-3. An output of the delay element 134-3 is input to the driving device 130-4, which provides a fourth gain $a_3$. The output of the delay element 134-3 is also input to the delay element 134-$n$. An output of the delay element 134-$n$ is input to the driving device 130-$n$, which provides a gain $a_n$.

Outputs of the driving device 130-$n$ and the driving device 130-4 are input to the summer 138-4. Outputs of the driving device 130-3 and the summer 138-4 are input to the summer 138-3. Outputs of the driving device 130-2 and the summer 138-3 are input to the summer 138-2. Outputs of the driving device 130-1 and the summer 138-2 are input to the summer 138-1. An output of the summer 138-1 is transmitted over the communications channel 46 to the receiver at the opposite end of the communications channel 46. While two-input summing circuits 134-1, 134-2, 134-3, . . . , and 134-$n$ are shown, summing circuits with three or more inputs can also be used to reduce the number of summing circuits 134.

While the circuit shown in FIG. 8 includes a primary stage 142 and three or more pre-emphasis stages 144-1, 144-2, 144-3 . . . , and 144-*n* (generally identified 144), the transmitter 100 can include the primary stage 142 and one or more pre-emphasis stages 144. The number of pre-emphasis stages 144 that are used for a particular design will depend on the accuracy of the impulse response that is desired and the desired cost of the circuit. Increasing the number of pre-emphasis stages 133 generally increases the cost of the transmitter 100.

The transmitter 100 that is shown in FIG. 8 implements the transfer function set forth below:

$$\text{Output} = a_0 + a_1 z^{-1} + a_2 z^{-2} + \ldots a_n z^{-n}$$

Figure 9A:
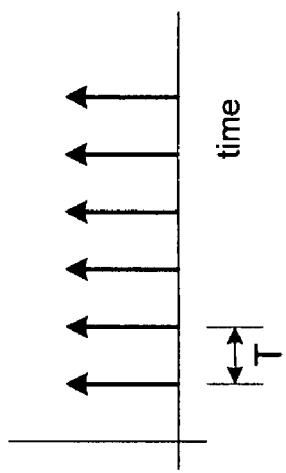
FIGS. 9A-9C are waveforms for multi-clocking.
Figure 9B:
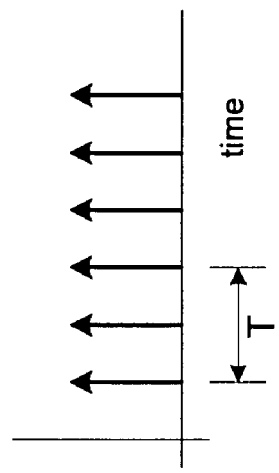
Figure 9C:
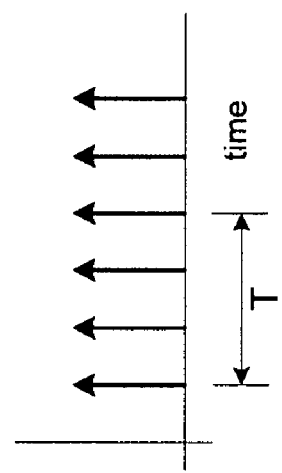

While the foregoing example illustrates terms with unit delay elements, fractional delay elements can also be used. Referring now to FIGS. 9A-9C, using multi-clocking, the terms can be delayed for partial periods, such as T/2, T/3, . . . , or T/N. An example with three pre-emphasis terms and partial periods is as follows:

$$\text{Output} = a_0 + a_1 z^{-1/2} + a_2 z^{-1} + a_3 z^{-3/2}$$

In addition, the pre-emphasis stages 144 can be limited to odd delays, even delays or any other combination using additional delay elements. For example, $$\text{Output} = a_0 + a_1 z^{-1} + a_3 z^{-3} + a_5 z^{-5}$$

The gains $a_0$, $a_1$, $a_2$, . . . , and $a_n$ can be positive, zero or negative, and not limited to integer values. Still other variations will be apparent to skilled artisans.

Figure 10:
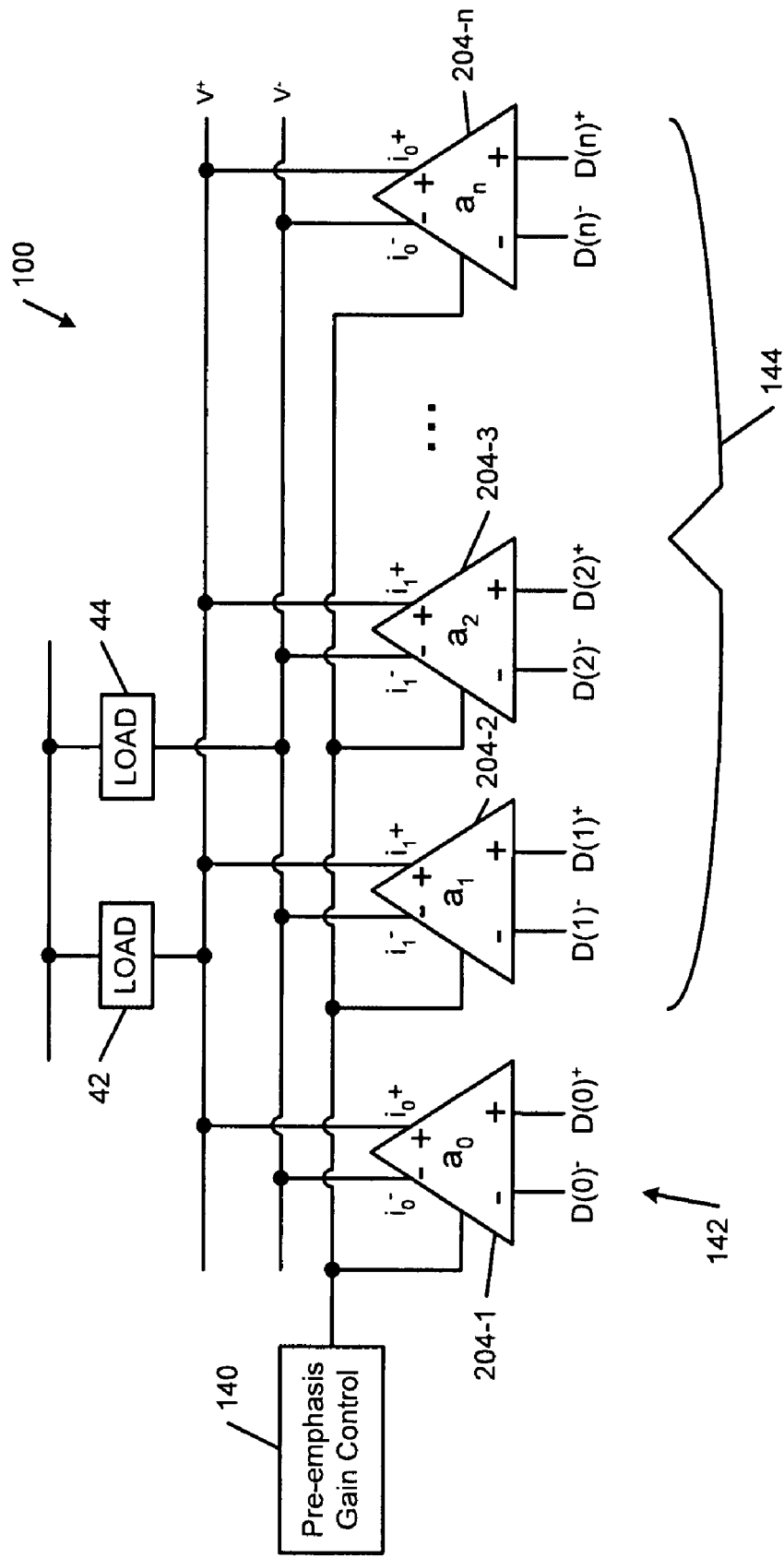
FIG. 10 is a functional block diagram of exemplary driving devices with programmable gain.
Figure 11:
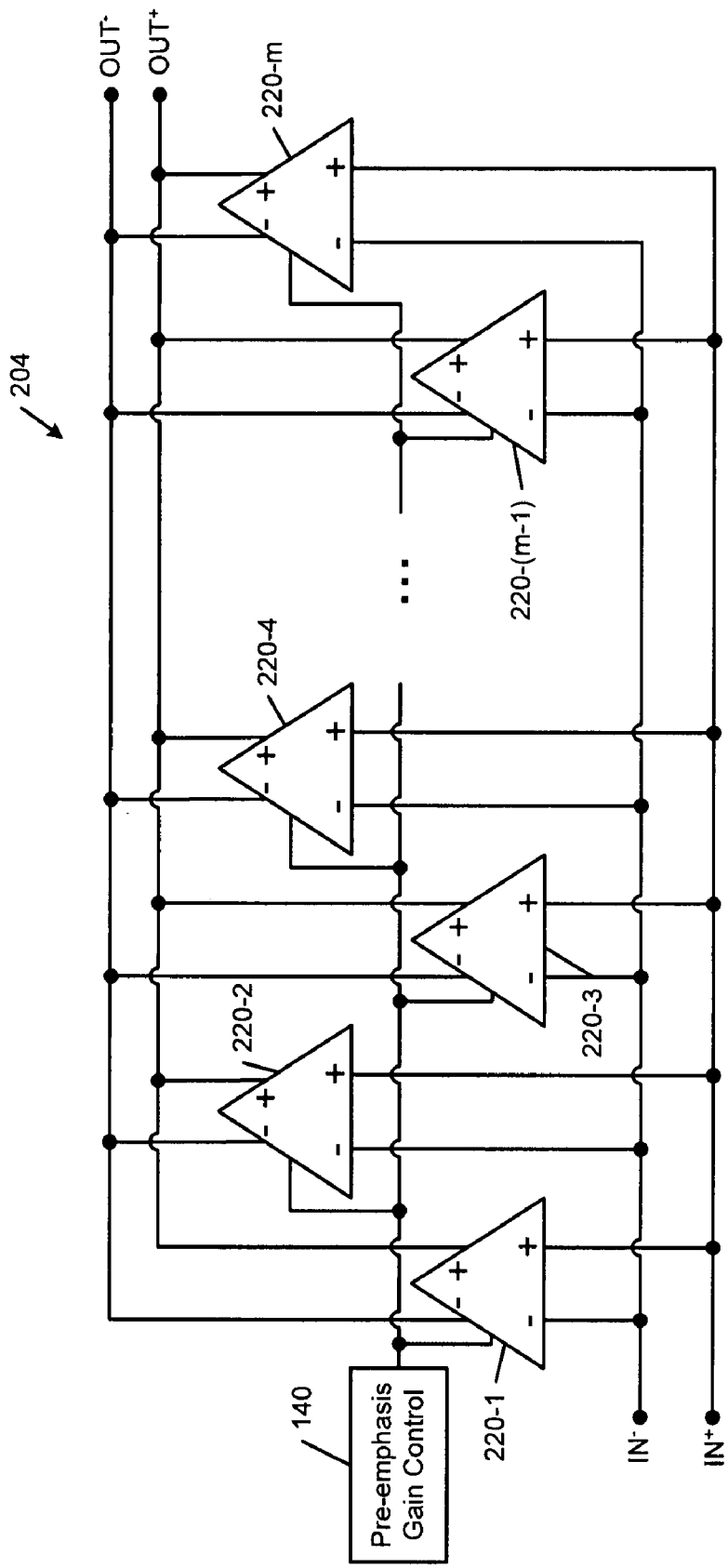
FIG. 11 is a functional block diagram of one of the driving devices of FIG. 10.

Referring now to FIGS. 10 and 11, an exemplary transmitter 100 is shown and includes main and pre-emphasis stages 142 and 144, respectively. Data D(0) is input to a main driving device 164-1 which provides the first gain $a_0$. Delayed data D(1), D(2), . . . , and D(n) are input to driving devices 204-2, 204-3, . . . , 204-*n*, respectively, having the gains $a_1$, $a_2$, . . . , and $a_n$, respectively. The pre-emphasis gain control circuit 140 adjusts the gain of the data D(0) and the delayed data D(1), D(2), . . . and D(n) to provide a desired transmission characteristic. The desired transmission characteristics of various different media can be determined in advanced and stored in the pre-emphasis gain control circuit 140. Dip adjusts and/or software adjusts can be used to select the gain settings and delays for the particular medium being used.

Referring now to FIG. 11, one of the driving devices 204 is illustrated in further detail. Each driving device 164 includes one or more differential amplifiers 220-1, 220-2, 220-3, . . . , 220-*m* having inputs coupled to input lines IN+ and IN− and outputs coupled to output lines OUT and OUT. The driving devices 204 of the transmitter 100 may have different numbers of differential amplifiers 220 as needed. The pre-emphasis gain control circuit 210 increases or decreases gain by enabling or disabling one or more differential amplifiers 220.

By providing programmable pre-emphasis, the transmitter 100 works with media having different transmission characteristics. With pre-emphasis, the transmitter provides compensation for degradation that occurs during transmission over the communications channel to reduce receiver error rates.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A high-speed serial ATA physical layer comprising:
    a serial ATA control circuit;
    a serial ATA multiplexer that outputs one of a plurality of serial ATA signals,
        wherein said one of said plurality of serial ATA signals is selected by said serial ATA control circuit; and
    a serial ATA analog front end that provides a first gain and pre-emphasis to said selected one of said plurality of serial ATA signals,
        wherein said pre-emphasis alters a transmission characteristic of said selected one of said plurality of serial ATA signals.

2. The high-speed serial ATA physical layer of claim 1, wherein said serial ATA physical layer is implemented in at least one of a serial ATA device and a serial ATA host.

3. The high-speed serial ATA physical layer of claim 1, wherein said multiplexer receives L input lines at x frequency and outputs said selected one of said plurality of serial ATA signals at L*x frequency, and wherein L*x is greater than 1.4 GHz.

4. The high-speed serial ATA physical layer of claim 1, wherein:
    said communications channel has a band-limiting transmission characteristic; and
    said pre-emphasis circuit compensates for said band-limiting transmission characteristic.

5. The high-speed serial ATA physical layer of claim 1, wherein said pre-emphasis is programmable.

6. The high-speed serial ATA physical layer of claim 5, wherein said serial ATA analog front end includes a pre-emphasis circuit that is programmed using at least one of data stored in memory and data input to said serial ATA physical layer.

7. The high-speed serial ATA physical layer of claim 1, wherein:
    said serial ATA analog front end includes a pre-emphasis circuit; and
    said pre-emphasis circuit compensates for transmission characteristics of the communications medium.

8. The high-speed serial ATA physical layer of claim 1, wherein said serial ATA pre-emphasis circuit adjusts gain of delayed signals that are generated based on said serial ATA signal to alter a transmission characteristic of said serial ATA signal.

9. The high-speed serial ATA physical layer of claim 1, wherein serial ATA pre-emphasis circuit provides said pre-emphasis based on a channel transmission characteristic.

10. The high-speed serial ATA physical layer of claim 1, wherein said pre-emphasis is preprogrammed.

11. A high-speed serial ATA physical layer comprising:
    a serial ATA control circuit;
    a serial ATA multiplexer that outputs one of a plurality of serial ATA signals,
        wherein said one of said plurality of serial ATA signals that is selected by said serial ATA control circuit; and
    a serial ATA analog front end that provides a first gain and pre-emphasis to said selected one of said plurality of serial ATA signals,
    wherein:
        said pre-emphasis alters a transmission characteristic of said selected one of said plurality of serial ATA signals; and
        said serial ATA analog front end includes:
            a first driver that generates a first amplified signal; and a pre-emphasis circuit that includes:
- a first delay element that delays said selected one of said plurality of serial ATA signals to generate a first delayed signal;
- a second driver that amplifies said first delayed signal using a second gain to generate a second amplified signal; and
- a first summing circuit that adds said first amplified signal and said second amplified signal to generate a sum.

12. The high-speed serial ATA physical layer of claim 11, wherein said pre-emphasis circuit further includes:
- a second delay element that delays said second amplified signal to generate a second delayed signal; and
- a third driver that amplifies said second delayed signal using a third gain to generate a third amplified signal,
- wherein said first summing circuit adds said third amplified signal to said sum.

13. The high-speed serial ATA physical layer of claim 12, wherein said pre-emphasis circuit further includes:
- a third delay element that delays said third amplified signal to generate a third delayed signal; and
- a fourth driver that amplifies said third delayed signal using a fourth gain to generate a fourth amplified signal,
- wherein said first summing circuit adds said fourth amplified signal to said sum.

14. The high-speed serial ATA physical layer of claim 13, wherein said first, second and third delay elements provide at least one of a unit delay and a partial unit delay.

15. The high-speed serial ATA physical layer of claim 11, wherein said second driver includes:
- a pre-emphasis gain control circuit that controls said second gain; and
- m differential amplifiers comprising:
    - differential inputs that communicate with first and second inputs;
    - differential outputs that communicate with first and second outputs and
    - enable inputs that communicate with said pre-emphasis gain control circuit,
- wherein said pre-emphasis gain control circuit selectively enables said m differential amplifiers to adjust said second gain.

16. The high-speed serial ATA physical layer of claim 11, wherein said pre-emphasis circuit adjusts delays of said first and second delay elements based on the communication channel medium.

17. The high-speed serial ATA physical layer of claim 11, wherein said pre-emphasis circuit adjusts said first and second gains based on the communication channel medium.

18. A high-speed serial ATA physical layer comprising:
- a serial ATA control circuit;
- a serial ATA multiplexer that outputs one of a plurality of serial ATA signals,
    - wherein said one of said plurality of serial ATA signals that is selected by said serial ATA control circuit; and
- a serial ATA analog front end that provides a first gain and pre-emphasis to said selected one of said plurality of serial ATA signals,
- wherein:
    - said pre-emphasis alters a transmission characteristic of said selected one of said plurality of serial ATA signals; and
    - said serial ATA analog front end includes a first driver that includes:
        - a gain control circuit that controls said first gain; and
        - n differential amplifiers comprising:
            - differential inputs that communicate with first and second inputs;
            - differential outputs that communicate with first and second outputs; and
            - enable inputs that communicate with said gain control circuit,
    - wherein said gain control circuit selectively enables said n differential amplifiers to adjust said first gain.

* * * * *